United States Patent
Safavi Naeini et al.

(10) Patent No.: US 10,341,244 B2
(45) Date of Patent: Jul. 2, 2019

(54) APPARATUS AND METHOD FOR SELECTION OF ENHANCED DISTRIBUTED CHANNEL ACCESS PARAMETERS FOR OFDMA

(71) Applicant: Nokia Technologies Oy, Espoo (FI)

(72) Inventors: Hossein Ali Safavi Naeini, Schererville, IN (US); Sayantan Choudhury, Berkeley, CA (US); Klaus Franz Doppler, Albany, CA (US)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 15/055,983

(22) Filed: Feb. 29, 2016

(65) Prior Publication Data

US 2016/0295434 A1  Oct. 6, 2016

Related U.S. Application Data

(60) Provisional application No. 62/127,245, filed on Mar. 2, 2015.

(51) Int. Cl.
| | | |
|---|---|---|
| *H04L 12/807* | (2013.01) | |
| *H04W 40/04* | (2009.01) | |
| *H04W 74/08* | (2009.01) | |
| *H04L 5/00* | (2006.01) | |
| *H04W 84/12* | (2009.01) | |
| *H04W 88/08* | (2009.01) | |

(52) U.S. Cl.
CPC ............. *H04L 47/27* (2013.01); *H04W 40/04* (2013.01); *H04W 74/0825* (2013.01); *H04L 5/0007* (2013.01); *H04W 84/12* (2013.01); *H04W 88/08* (2013.01)

(58) Field of Classification Search
CPC ..................................................... H04L 47/27
See application file for complete search history.

(56) References Cited

U.S. PATENT DOCUMENTS

| | | | |
|---|---|---|---|
| 9,668,283 B2* | 5/2017 | Abraham | H04B 7/0452 |
| 2015/0103710 A1* | 4/2015 | Lv | H04W 74/0816 |
| | | | 370/311 |
| 2016/0212768 A1* | 7/2016 | Wentink | H04L 47/27 |

OTHER PUBLICATIONS

"Part 11: Wireless LAN Medium Access Control (MAC) and Physical Layer (PHY) Specifications", Amendment 4: Enhancements for Very High Throughput for Operation in Bands below 6 GHz, IEEE Computer Society, IEEE Std 802.11ac, 2013, 425 Pages.

* cited by examiner

*Primary Examiner* — Jeffrey M Rutkowski
*Assistant Examiner* — Chae S Lee
(74) *Attorney, Agent, or Firm* — Nokia Technologies Oy

(57) ABSTRACT

One embodiment is directed to a method comprising selecting a group of packets for at least one access category, determining a set of contention parameters based on the at least one access category, transmitting the selected group of packets by using the determined set of contention parameters, obtaining information about collision of the transmitted group of packets, and determining an updated set of contention parameters based on the obtained collision information and a predefined condition.

9 Claims, 5 Drawing Sheets

APPARATUS AND METHOD FOR SELECTION OF ENHANCED DISTRIBUTED CHANNEL ACCESS PARAMETERS FOR OFDMA

RELATED APPLICATIONS

This application relates to, and claims the benefit of U.S. Application filing No. 62/127,245, entitled, "Apparatus and method for selection of enhanced distributed channel access parameters for OFDMA", filed on Mar. 2, 2015, which is hereby incorporated by reference in its entirety.

TECHNICAL FIELD

The present application relates generally to an apparatus and a method for selection of enhanced distributed channel access (EDCA) parameters for orthogonal frequency division multiple access (OFDMA).

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Wi-Fi is a local area wireless technology for wireless local area network (WLAN) product based on institute of electrical and electronics engineers (IEEE) 802.11 standards. Developments in the 802.11n and 802.11ac standards have extended Wi-Fi to allow wider bandwidths for signal transmission include 40/80/160 MHz modes that employ a form of channel bonding to increase data rates. In doing so, the Wi-Fi device can only target a single receiver at a time, i.e. it is a single user orthogonal frequency division multiplexing (OFDM) transmission.

These increased channel widths have been less effective when the data being transmitted consists of smaller packets or when the number of users is large. The reality is that the repeated contention for channel access to transmit multiple small packets to different users presents a large overhead in current Wi-Fi deployments. This is a scenario that the 802.11ax standard wishes to tackle.

SUMMARY

Various aspects of examples of the invention are set out in the claims.

According to a first aspect of the present invention, a method may include by an apparatus, selecting a group of packets for at least one access category; determining a set of contention parameters based on the at least one access category; transmitting the selected group of packets by using the determined set of contention parameters; obtaining information about collision of the transmitted group of packets; and determining an updated set of contention parameters based on the obtained collision information and a predefined condition.

According to a second aspect of the present invention, an apparatus may include at least one processor, and at least one memory including computer program code, wherein the at least one memory and the computer program code configured to, with the at least one processor, cause the apparatus at least to select a group of packets for at least one access category; determine a set of contention parameters based on the at least one access category; transmit the selected group of packets by using the determined set of contention parameters; obtain information about collision of the transmitted group of packets; and determine an updated set of contention parameters based on the obtained collision information and a predefined condition.

According to a third aspect of the present invention, a computer program product comprising a computer-readable medium bearing computer program code embodied therein for use with a computer, the computer program code may include code for selecting a group of packets for at least one access category; code for determining a set of contention parameters based on the at least one access category; code for transmitting the selected group of packets by using the determined set of contention parameters; code for obtaining information about collision of the transmitted group of packets; and code for determining an updated set of contention parameters based on the obtained collision information and a predefined condition.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
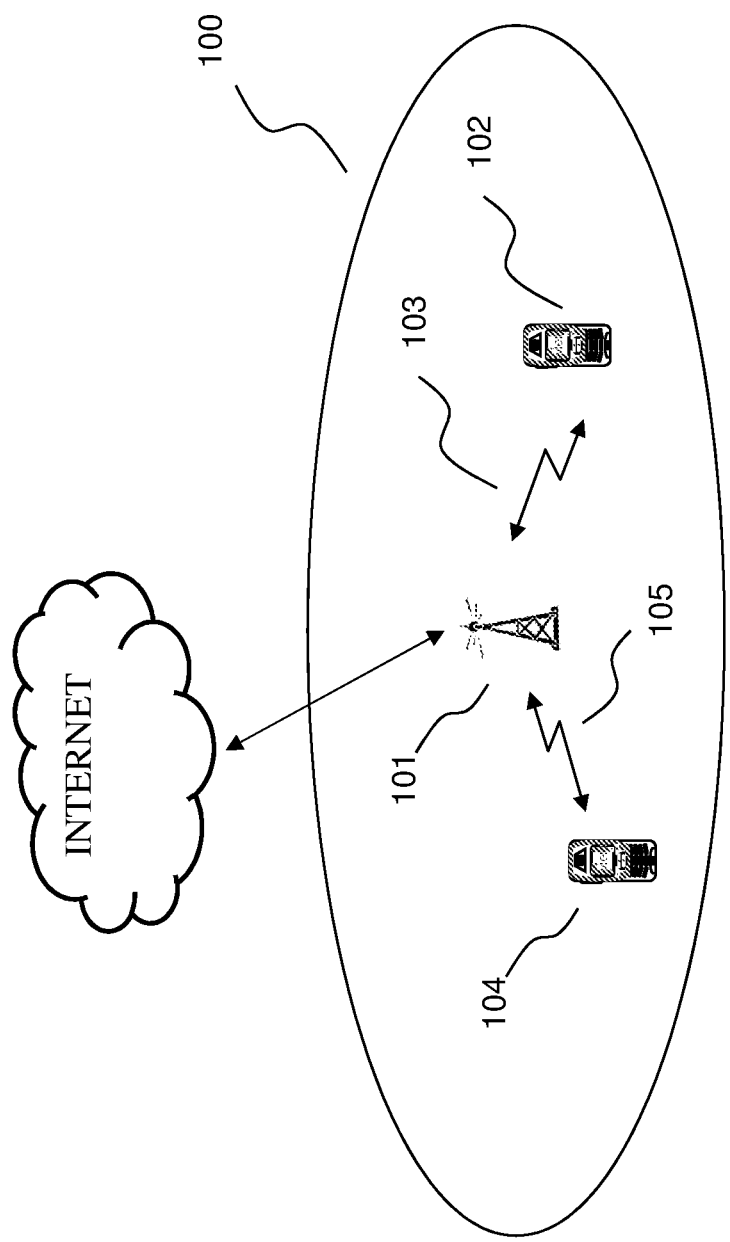
FIG. 1 illustrates an example Wi-Fi system in which various example embodiments of the application implement.

FIG. 1 illustrates an example Wi-Fi system 100 in which various example embodiments of the application implement. The example Wi-Fi system 100 comprises an access point (AP) 101 connecting to the internet. The AP 101 serves user equipments (UE) 102 and 104, such as for example, Wi-Fi stations, via communication paths 103 and 105, respectively. Although just one AP and two UEs are shown in FIG. 1, it is only for the purpose of illustration and the example wireless system 100 may comprise any number of AP(s) and UE(s).

The IEEE task group TGax has witnessed intense interest by the participants to implement orthogonal frequency division multiple access (OFDMA) extensions to Wi-Fi. OFDMA provides a series of advantages:
1. Gains due to multi-user diversity;
2. Reduced overhead for smaller packets;
3. The ability to better serve heterogeneous nodes (such as for example, legacy 20 MHz or low power nodes).

Currently when an 802.11ac AP serves a 20 MHz station, the remainder of the bandwidth (i.e. 60 MHz out of the total 80 MHz) remains unused for the duration of the transmission. Naturally, this is a large inefficiency in channel resource usage. Likewise, since 802.11ac APs share the same primary channel, no other APs are able to use the remaining 60 MHz. Therefore, adopting OFDMA in Wi-Fi may bring significant performance improvements.

Wi-Fi is basically a contention based medium. In Wi-Fi, enhanced distributed channel access (EDCA) parameters that govern contention for the channel are essential in determining performance and fairness. There are currently no methods to properly select the EDCA parameters that would be necessary for channel contention when serving multiple users with multiple data streams, potentially in different access categories (ACs), especially in the context of OFDMA.

Figure 2:
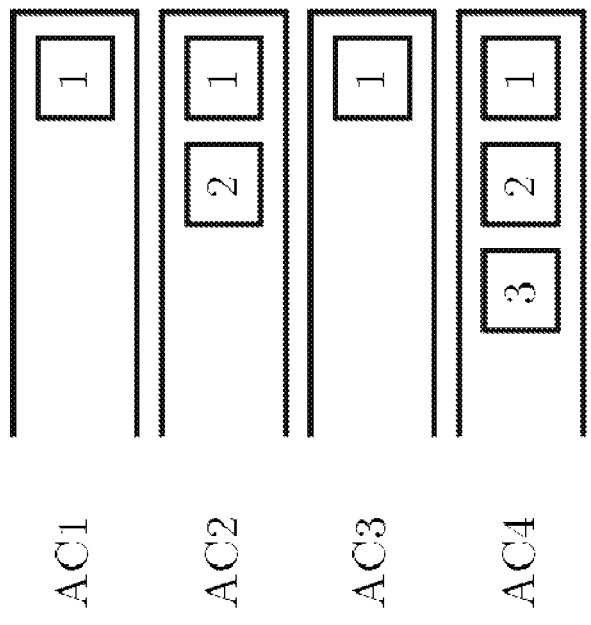
FIG. 2 shows an example how the data queues for different access categories may appear at an access point.

In an example embodiment, a method to select the appropriate EDCA parameters (selecting a group access category) for contention at the AP is proposed. At any given time, an access point may have data destined for multiple users in multiple access categories. Each access category corresponds to a set of contention parameters including such as for example the arbitration inter-frame spacing (AIFS) interval and the minimum/maximum contention window size. If the AP is to serve multiple users, it may need to simultaneously transmit packets from different access categories to make best use of the channel. FIG. 2 shows an example how the data queues for different access categories may appear at the AP. In order to contend for access to the channel, the access point may select a group of packets and a corresponding access category using one of the following options:

1. Only select packets from a single access category and use the corresponding access category contention parameters to access the channel;
2. Select a set of packets with varying access categories and use the contention parameters associated with the highest priority access category in the set;
3. Select a set of packets with varying access categories and use the contention parameters associated with the lowest priority access category in the set.

Once the packet group has been selected and the group access category determined, the AP will contend for the channel according to the selected parameters (e.g., AIFS, contention window) for that access category.

Figure 3:
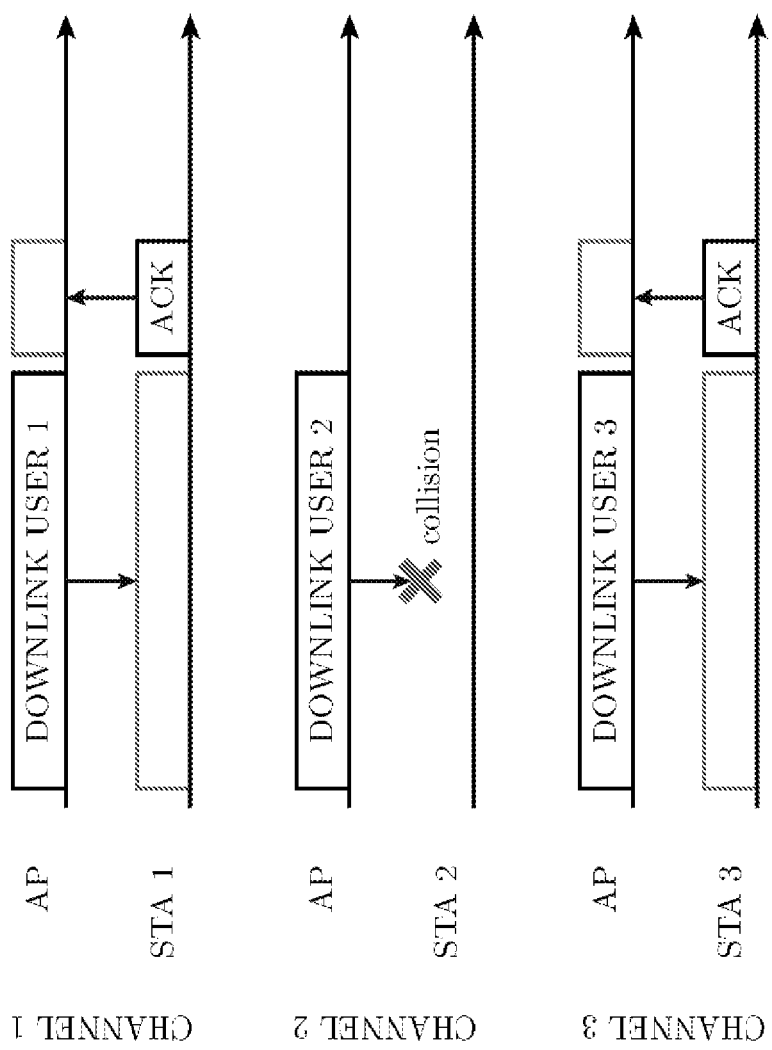
FIG. 3 illustrates an example how collision may happen according to an example embodiment of the application.

In an example embodiment, a method to account for collisions when serving multiple users simultaneously is proposed. Once the AP sends a group of packets to multiple users, it is possible that any subset of the group will be erroneously received due to interference or noise. In legacy Wi-Fi (802.11ac and before), the back off counter would double as a result of the erroneous reception up to a maximum value. However, when serving multiple users, collision on a single channel may not be a good indicator of general congestion. This can be illustrated in an example shown in FIG. 3. In FIG. 3, the AP selects data packets for three stations and transmits them in downlink as a whole data package. In the example of FIG. 3, while stations 1 and 3 correctly receive the data packets and therefore send acknowledge signal (ACK) back to AP, there is a collision on the communication path towards station 2. The AP will determine the contention parameters based on the ACKs it has received and the collisions it detects.

In an example embodiment, during a transmit opportunity (TXOP), the contention window size may be doubled based on one of the following conditions:
1. The number of collided packets in a group is above a certain threshold;
2. The number of collided packets exceeds certain percentage of the total number of packets sent.
3. The number of OFDMA resource blocks containing collided packets exceeds a certain percentage of total number of OFDMA resource blocks utilized in the transmission.
4. The number of OFDMA resource blocks containing collided packets exceeds a certain threshold.

When the AP next contends for the channel, it selects a back-off counter based on the minimum of the new contention window size and the max contention window size of the selected access category. We illustrate this in the following example.

In this example, an AP transmits 8 packets in parallel (1 on each channel) with a group access category of 2. It does not receive an ACK on 3 of the packets. If one of the above conditions is met (e.g. the threshold of erroneous packets was set to 2), the contention window size is doubled. For the next transmission, the AP selects an access category of 1. It checks to see if the doubled contention window size exceeds the maximum allowed size for AC1. If so, the AP uses the max contention window value for AC1, otherwise it employs the recently doubled contention window size.

In an example embodiment, an alternate method for dealing with collisions would be to skip transmission on a collided channel for the next contention phase. In that case, once a collision is detected on a channel or an OFDMA resource block, the AP may abstain from transmitting on that channel or OFDMA resource block for certain transmission opportunities or certain period of time. For example, an AP transmits 8 packets with a group access category of 1. It does not receive an ACK on 3 of the packets. For the next transmission, it does not double the contention window size, but simply abstains from transmission on the three collided channels.

In an example embodiment, an alternate method would be to have an individual back-off on each channel or OFDMA resource block (or packet in the event a packet to a user spans multiple channels or OFDMA resource blocks) and to apply EDCA rule for each of the channel or OFDMA resource block to attempt transmission only on the channels or OFDMA resource blocks for which the back-off has expired. In an example embodiment, if there is data in the queues of multiple channels, the AP may wait for the counters on contiguous channels to expire if they're below a certain remaining duration. This method may require a STA to maintain multiple independent back-off counters and hence, may increase the implementation complexity.

Figure 4:
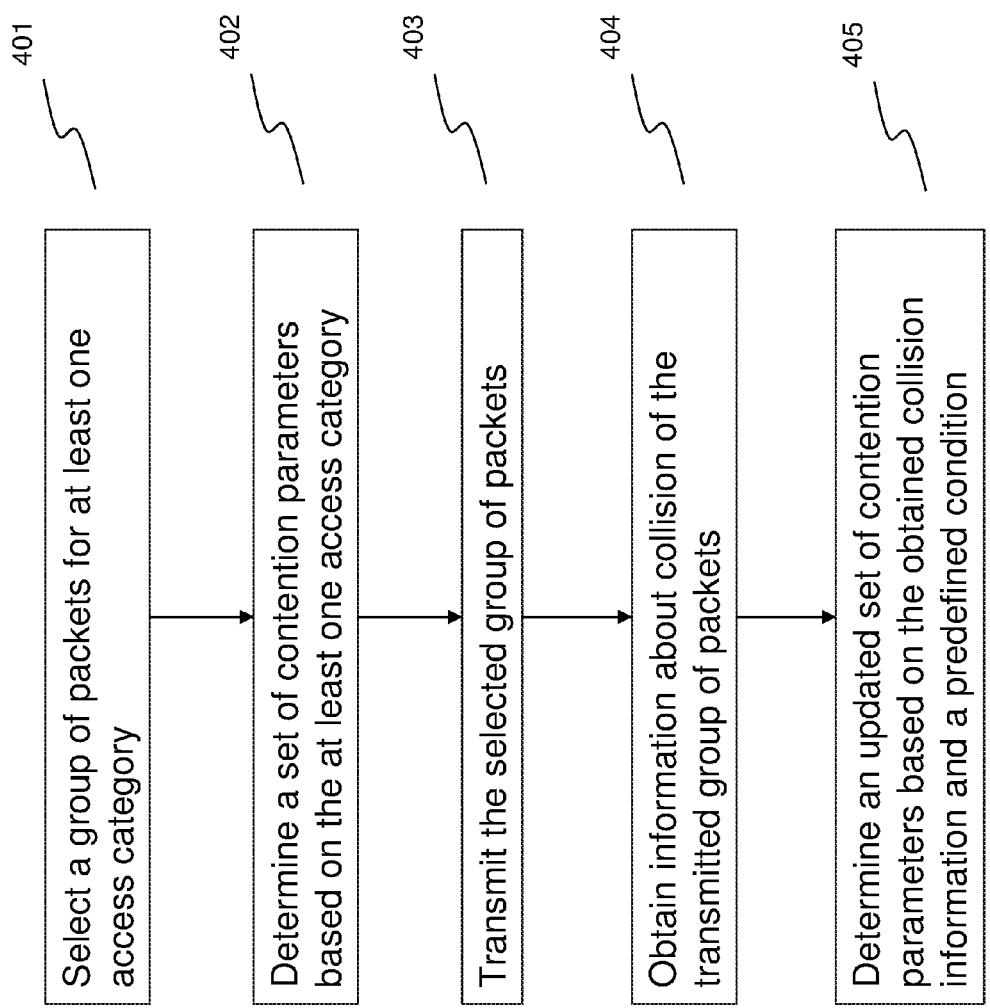
FIG. 4 illustrates a flowchart in accordance with an example embodiment of the application.

FIG. 4 illustrates a flowchart in accordance with an example embodiment of the application. In the example of FIG. 4, an AP, such as for example, the AP 101 of FIG. 1, selects at step 401 a group of packets for at least one access category. The selected group of packets is intended for at least one station, such as for example, the stations 102 or/and 104 of FIG. 1. At step 402, the AP determines a set of contention parameters based on the at least one access category. The set of contention parameters may comprise such as for example the AIFS interval and the minimum/maximum contention window size, and are used for channel contention. Once the AP's channel access is granted, the AP transmits the selected group of packets at step 403 and obtains information about possible collision of the transmitted packets at step 404. At step 405, based on the obtained collision information, the AP can determine an updated set of contention parameters for future use according to certain predefined condition.

Figure 5:
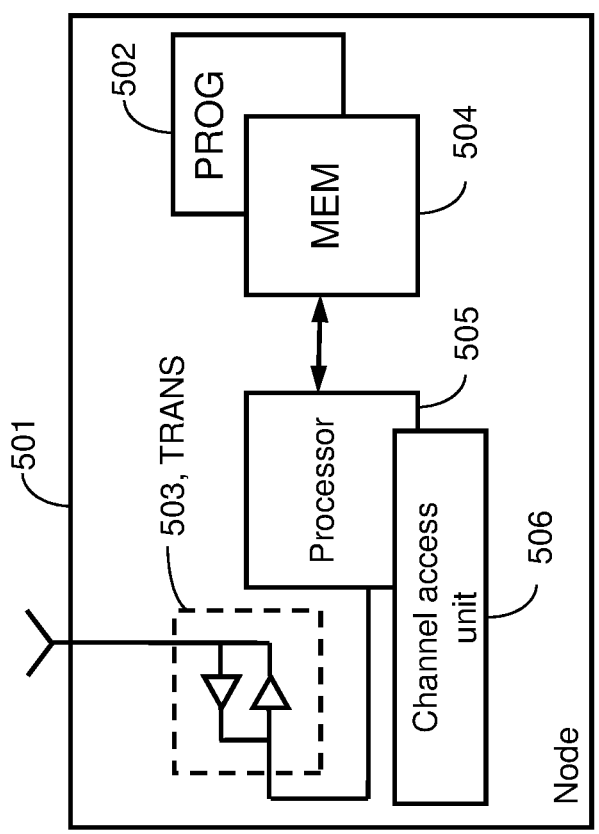
FIG. 5 illustrates a simplified block diagram of an example apparatus that is suitable for use in practicing various example embodiments of this application.

Reference is made to FIG. 5 for illustrating a simplified block diagram of an example apparatus that is suitable for use in practicing various example embodiments of this application. In FIG. 5, a node, 501, such as for example, the AP 101 in FIG. 1, includes at least one processor 505, at least one memory (MEM) 504 coupled to the at least one processor 505, and a suitable transceiver (TRANS) 503 (having a transmitter and a receiver) coupled to the at least one processor 505. The at least one MEM 504 stores a program (PROG) 502. The TRANS 503 is for bidirectional wireless communications.

As shown in FIG. 5, the node 501 may further include a channel access unit 506. The unit 506, together with the at least one processor 505 and the PROG 502, may be utilized by the node 501 in conjunction with various example embodiments of the application, as described herein.

The PROG 502 is assumed to include program instructions that, when executed by the associated processor, enable the electronic apparatus to operate in accordance with the example embodiments of this disclosure, as discussed herein.

In general, the various example embodiments of the apparatus 501 can include, but are not limited to, Wi-Fi access point, Wi-Fi stations, cellular phones, cellular base stations, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by the processor 505 of the node 501, or by hardware, or by a combination of software and hardware.

The MEM 504 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor 505 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be improving the spectrum efficiency while remaining the backward compatibility. The resulted design is suitable for co-existence between advanced Wi-Fi nodes and legacy nodes. Moreover, the proposed scheme ensures a better balance and priorities the retransmissions of the OFDMA nodes based on success of the initial transmission.

Embodiments of the present invention may be implemented in software, hardware, application logic or a combination of software, hardware and application logic. The software, application logic and/or hardware may reside on an apparatus such as a station, an access point or other wireless communication devices. If desired, part of the software, application logic and/or hardware may reside on a node 501, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention.

For example, Wi-Fi system has been assumed. It is straightforward to generalize the idea to other contention-based communication system. One example is the licensed assisted access (LAA) scheme of long term evolution (LTE) in $3^{rd}$ generation partnership project (3GPP). In LTE LAA, traffic load may be offload onto unlicensed frequencies, such as those used by Wi-Fi, whose presence may be represented by one or more Wi-Fi APs. Since LTE in unlicensed may also use OFDMA and contention-based listen before talk mechanism, the example embodiments described herein can be adopted without departing from the scope of the present invention.

Further, the various names used for the described parameters are not intended to be limiting in any respect, as these parameters may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:

1. A method, comprising:
by an apparatus,
selecting a group of packets for at least one access category;
determining a set of contention parameters based on the at least one access category;
transmitting the selected group of packets by using the determined set of contention parameters;
obtaining information about collision of the transmitted group of packets; and
determining an updated set of contention parameters based on the obtained collision information and a predefined condition;
wherein the set of contention parameters includes a contention window size, and the determining an updated set of contention parameters comprises increasing the contention window size, determining a new access category, and using the minimum of the increased contention window size and the maximum allowed contention window size of the new access category as the updated contention window size.

2. The method according to claim 1, wherein selecting a group of packets and determining a set of contention parameters comprises one of selecting packets from a single access category and using the corresponding set of contention parameters of the access category, selecting a group of packets with various access categories and using the set of contention parameters associated with the highest priority access category in the group, and selecting a group of packets with various access categories and using the set of contention parameters associated with the lowest priority access category in the group.

3. The method according to claim 1, wherein the predefined condition comprises at least one of the number of collided packets in the group is above a threshold, and the number of collided packets exceeds a percentage of the total number of packets transmitted.

4. An apparatus, comprising:
at least one processor;
and at least one memory including computer program code,
wherein the at least one memory and the computer program code are configured to, with the at least one processor, cause the apparatus at least to:
select a group of packets for at least one access category;
determine a set of contention parameters based on the at least one access category;
transmit the selected group of packets by using the determined set of contention parameters;
obtain information about collision of the transmitted group of packets; and
determine an updated set of contention parameters based on the obtained collision information and a predefined condition;
wherein the set of contention parameters includes a contention window size, and in order to determine an updated set of contention parameters, the at least one memory and the computer program code are configured to, with the at least one processor, cause the apparatus at least to increase the contention window size, determine a new access category, and use the minimum of the increased contention window size and the maximum allowed contention window size of the new access category as the updated contention window size.

5. The apparatus according to claim 4, when selecting a group of packets and determining a set of contention parameters, the at least one memory and the computer program code are configured to, with the at least one processor, cause the apparatus at least to select packets from a single access category and use the corresponding set of contention parameters of the access category, select a group of packets with various access categories and use the set of contention parameters associated with the highest priority access category in the group, or select a group of packets with various access categories and use the set of contention parameters associated with the lowest priority access category in the group.

6. The apparatus according to claim 4, wherein the predefined condition comprises at least one of the number of collided packets in the group is above a threshold, and the number of collided packets exceeds a percentage of the total number of packets transmitted.

7. A computer program product comprising a non-transitory computer-readable medium bearing computer program code embodied therein for use with a computer, when executed by a processor of the computer, the computer program code comprising:
code for selecting a group of packets for at least one access category;
code for determining a set of contention parameters based on the at least one access category;
code for transmitting the selected group of packets by using the determined set of contention parameters;
code for obtaining information about collision of the transmitted group of packets; and
code for determining an updated set of contention parameters based on the obtained collision information and a predefined condition;
wherein the set of contention parameters includes a contention window size, and the code for determining an updated set of contention parameters comprises code for increasing the contention window size, determining a new access category, and using the minimum of the increased contention window size and the maximum allowed contention window size of the new access category as the updated contention window size.

8. The computer program product according to claim 7, wherein the code for selecting a group of packets and determining a set of contention parameters comprises code for one of selecting packets from a single access category and using the corresponding set of contention parameters of the access category, selecting a group of packets with various access categories and using the set of contention parameters associated with the highest priority access category in the group, and selecting a group of packets with various access categories and using the set of contention parameters associated with the lowest priority access category in the group.

9. The computer program product according to claim 7, wherein the predefined condition comprises at least one of the number of collided packets in the group is above a threshold, and the number of collided packets exceeds a percentage of the total number of packets transmitted.

* * * * *